United States Patent
Graham et al.

(10) Patent No.: US 10,948,374 B2
(45) Date of Patent: Mar. 16, 2021

(54) TUB OVERFLOW DRAIN TEST SYSTEM

(71) Applicant: Keeney Holdings LLC, Cleveland, OH (US)

(72) Inventors: Christopher Graham, Portland, CT (US); Matthew J. Siena, Portland, CT (US); Vincent Charest, Litchfield, CT (US); Andrew Holden, West Hartford, CT (US); Brian W. Suriner, Glastonbury, CT (US)

(73) Assignee: Keeney Holdings LLC, Cleveland, OH (US)

(*) Notice: Subject to any disclaimer, the term of this patent is extended or adjusted under 35 U.S.C. 154(b) by 44 days.

(21) Appl. No.: 16/403,872

(22) Filed: May 6, 2019

(65) Prior Publication Data

US 2019/0346331 A1   Nov. 14, 2019

Related U.S. Application Data

(60) Provisional application No. 62/668,300, filed on May 8, 2018.

(51) Int. Cl.
*G01M 3/02* (2006.01)
*E03C 1/244* (2006.01)
(Continued)

(52) U.S. Cl.
CPC ............ *G01M 3/022* (2013.01); *E03C 1/244* (2013.01); *G01M 3/14* (2013.01); *E03C 2001/2413* (2013.01)

(58) Field of Classification Search
CPC ........ G01M 4/022; G01M 4/14; G01M 3/022; G01M 3/14; E03C 1/244; E03C 2001/2413
See application file for complete search history.

(56) References Cited

U.S. PATENT DOCUMENTS

| | | | | |
|---|---|---|---|---|
| 438,465 | A | * | 10/1890 | Blessing ................. E03C 1/244 4/687 |
| 2,036,614 | A | * | 4/1936 | Tharp ..................... E03C 1/306 4/255.07 |

(Continued)

FOREIGN PATENT DOCUMENTS

WO    1997029249 A1    8/1997

OTHER PUBLICATIONS

Breakaway Test Cap, Full Kits Breakaway Head Lift & Turn, JB Products Full Line Catalog 2014, p. 24.
Overflow Drain, Watco System Brochure, 2008.

*Primary Examiner* — John Fitzgerald
(74) *Attorney, Agent, or Firm* — Alix, Yale & Ristas, LLP

(57) ABSTRACT

A tub drain overflow test system employs a kit with a connecting pipe with a front cylindrical portion having an inner threading and an intermediate annular flange coaxial with the front cylindrical portion. The front cylindrical portion extends through an overflow hole of a tub so that the annular flange, optionally with a seal ring, abuts the rear surface of the tub wall. A test cap has outer threading that mates with inner threading of the front cylindrical portion. The test cap has an annular flange and a breakaway test seal with a projecting grip tab. The test cap has an inner lip that provides a catch for inwardly extending tabs on a fixture to attach. The test cap allows the overflow drain to be tested. A seal portion is removed to provide access to the opening and the finishing fixture is mounted in place.

20 Claims, 7 Drawing Sheets

US 10,948,374 B2
Page 2

(51) Int. Cl.
    *G01M 3/14* (2006.01)
    *E03C 1/24* (2006.01)

(56) References Cited

U.S. PATENT DOCUMENTS

| | | | |
|---|---|---|---|
| 2,064,569 A * | 12/1936 | Santucci | G01M 3/022 |
| | | | 220/236 |
| 2,321,176 A * | 6/1943 | Bloch | E03C 1/244 |
| | | | 4/687 |
| 2,374,642 A * | 5/1945 | Bloch | E03C 1/244 |
| | | | 4/687 |
| 2,403,859 A * | 7/1946 | Hatfield | G01M 3/022 |
| | | | 138/90 |
| 3,070,812 A * | 1/1963 | Skrmetta | E03C 1/244 |
| | | | 4/654 |
| 4,111,037 A * | 9/1978 | Fisher | A47K 3/001 |
| | | | 4/679 |
| 4,135,260 A * | 1/1979 | Gresh | E03C 1/244 |
| | | | 4/680 |
| 6,192,531 B1 | 2/2001 | Fritz et al. | |
| 6,618,875 B1 | 9/2003 | Oropallo et al. | |
| 6,637,050 B1 | 10/2003 | Ball | |
| 6,675,406 B2 | 1/2004 | Ball | |
| 6,691,411 B2 | 2/2004 | Ball | |
| 6,836,911 B2 | 1/2005 | Minnick | |
| 6,845,528 B2 | 1/2005 | Bantz | |
| 6,901,611 B2 | 6/2005 | McEntire et al. | |
| 7,127,752 B2 | 10/2006 | Ball | |
| 7,185,529 B2 | 3/2007 | Ball et al. | |
| 7,237,280 B1 | 7/2007 | Holden, Jr. et al. | |
| 7,503,083 B2 | 3/2009 | Ball | |
| D627,862 S | 11/2010 | Ball | |
| D627,863 S | 11/2010 | Ball | |
| D636,468 S | 4/2011 | Ball | |
| 8,028,357 B2 | 10/2011 | Ball | |
| 8,166,584 B2 | 5/2012 | Ball | |
| D665,062 S | 8/2012 | Ball | |
| 8,302,220 B2 | 11/2012 | Ball | |
| 8,321,970 B2 | 12/2012 | Ball | |
| D674,883 S | 1/2013 | Ball | |
| 8,505,132 B2 | 8/2013 | Ball | |
| 8,584,272 B2 | 11/2013 | Ball | |
| 8,607,376 B2 | 12/2013 | Ball | |
| 9,015,870 B2 | 4/2015 | Ball | |
| 9,015,876 B2 | 4/2015 | Ball | |
| D729,357 S | 5/2015 | Ball et al. | |
| 9,045,886 B2 | 6/2015 | Ball et al. | |
| 9,074,358 B2 | 7/2015 | Ball et al. | |
| 9,157,220 B2 | 10/2015 | Ball et al. | |
| 9,200,436 B2 | 12/2015 | Ball | |
| 9,663,930 B2 | 5/2017 | Ball | |
| 9,714,504 B2 | 7/2017 | Bird et al. | |
| 2002/0032926 A1 | 3/2002 | Lewis | |
| 2004/0055083 A1 | 3/2004 | Ball | |
| 2004/0055084 A1 | 3/2004 | Ball | |
| 2004/0143892 A1* | 7/2004 | Bantz | E03C 1/24 |
| | | | 4/295 |
| 2010/0163131 A1 | 7/2010 | Fehr et al. | |
| 2010/0243090 A1* | 9/2010 | Peterson | F16L 55/105 |
| | | | 138/90 |
| 2015/0089736 A1 | 4/2015 | Bird et al. | |
| 2017/0247867 A1 | 8/2017 | Ball | |
| 2018/0044899 A1* | 2/2018 | Ball | E03C 1/244 |

* cited by examiner

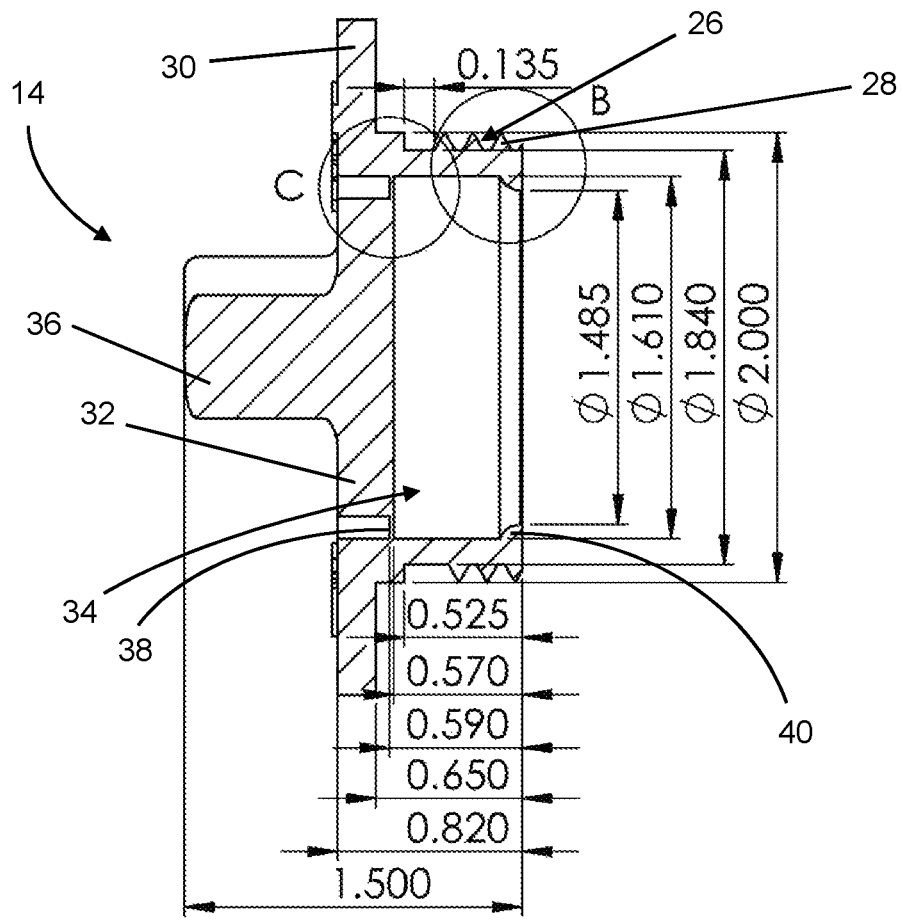
FIGURE 9A
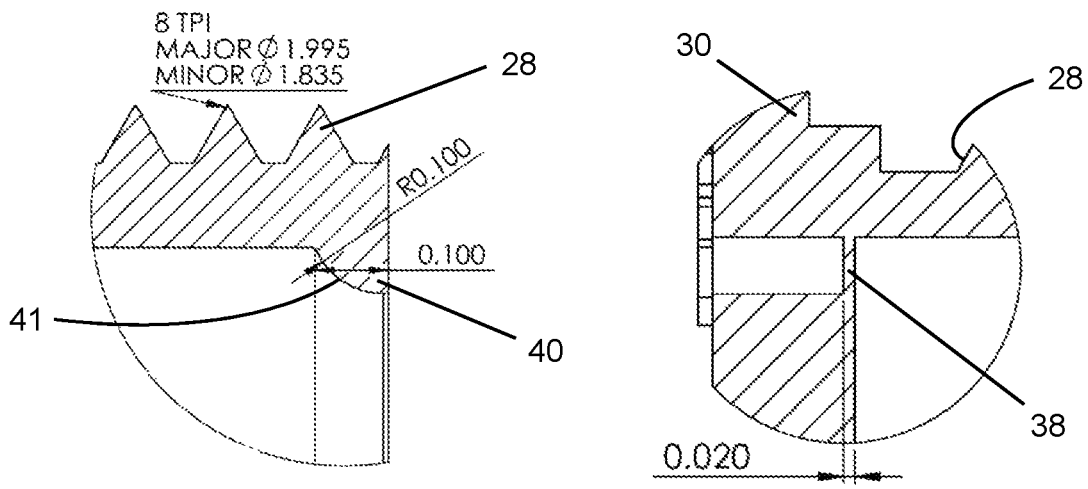
FIGURE 9B  FIGURE 9C

TUB OVERFLOW DRAIN TEST SYSTEM

BACKGROUND

In tubs, such as bathtubs, finished closure valves in the bottom of tubs and finished fixtures over the overflow outlets at the end of the tub are typically installed at the end of a project. This is to preserve these elements from damage during construction. It is important to check piping for both of the outlets for leaks before completion of the inspection process. This test involves running water down a vent attached to the drain until the water reaches a level above the tub and determining whether any of the piping leaks. In order for the test operation to be performed, a plug is usually inserted into the bottom drain of the tub and a sealing member (i.e., a fixture or similar) is placed on the overflow outlet opening.

Existing overflow fixtures define a center opening therein and may be fit with screw openings in the fixture to hold the fixture to the plumbing fixture. As mentioned, seal fixtures are known options for sealing the opening for testing. Some seal fixtures must be mechanically removed after testing and prior to attachment of an aesthetic decorative fixture on the outside. Other overflow systems exist that provide for attachment of the decorative fixture via engagement over the outer surface of a member securing the piping to the tub, which can present drawbacks in terms of robustness of attachment.

It would be useful to have a tub drain kit for an overflow opening that upon installation cures the above noted deficiencies.

SUMMARY

An overflow drain test system employs an overflow kit provided with a connecting pipe member with a front cylindrical portion having inner threading and an intermediate annular flange coaxial with the front cylindrical portion. The front cylindrical portion is configured to extend through the overflow hole in the wall of a tub with the annular flange abutting the rear surface of the wall. A test cap has an outer threading that mates with the inner threading of the front cylindrical portion of the connecting member, an annular flange and a breakaway test cap with projecting grip tab. The test cap defines an inner lip surface that provides a catch for inwardly extending tabs on an aesthetic finishing fixture, thereby providing for a robust attachment therewith.

The connecting member is preferably an elbow shaped member. The test cap has a transition portion for guiding tabs of the finishing fixture to an attached position. The transition portion may be a contoured surface or a ramp. The breakaway seal attaches to a thin plastic membrane adjacent the inlet. In one embodiment, the membrane has a thickness of approximately 0.02 inches. The finishing fixture tabs are preferably angularly spaced. The connecting member of the test cap and the finishing fixture are each unitary components having a plastic composition. The test cap has indicia indicating that the seal be broken off.

BRIEF DESCRIPTION OF THE DRAWINGS

FIG. 9A is a sectional view of the test cap of FIG. 8 taken along the line A-A thereof;

FIG. 9B is an enlarged sectional diagrammatic view of detail B of FIG. 9;

FIG. 9C is an enlarged sectional diagrammatic view of detail C of FIG. 9; and

DETAILED DESCRIPTION

Figure 10:
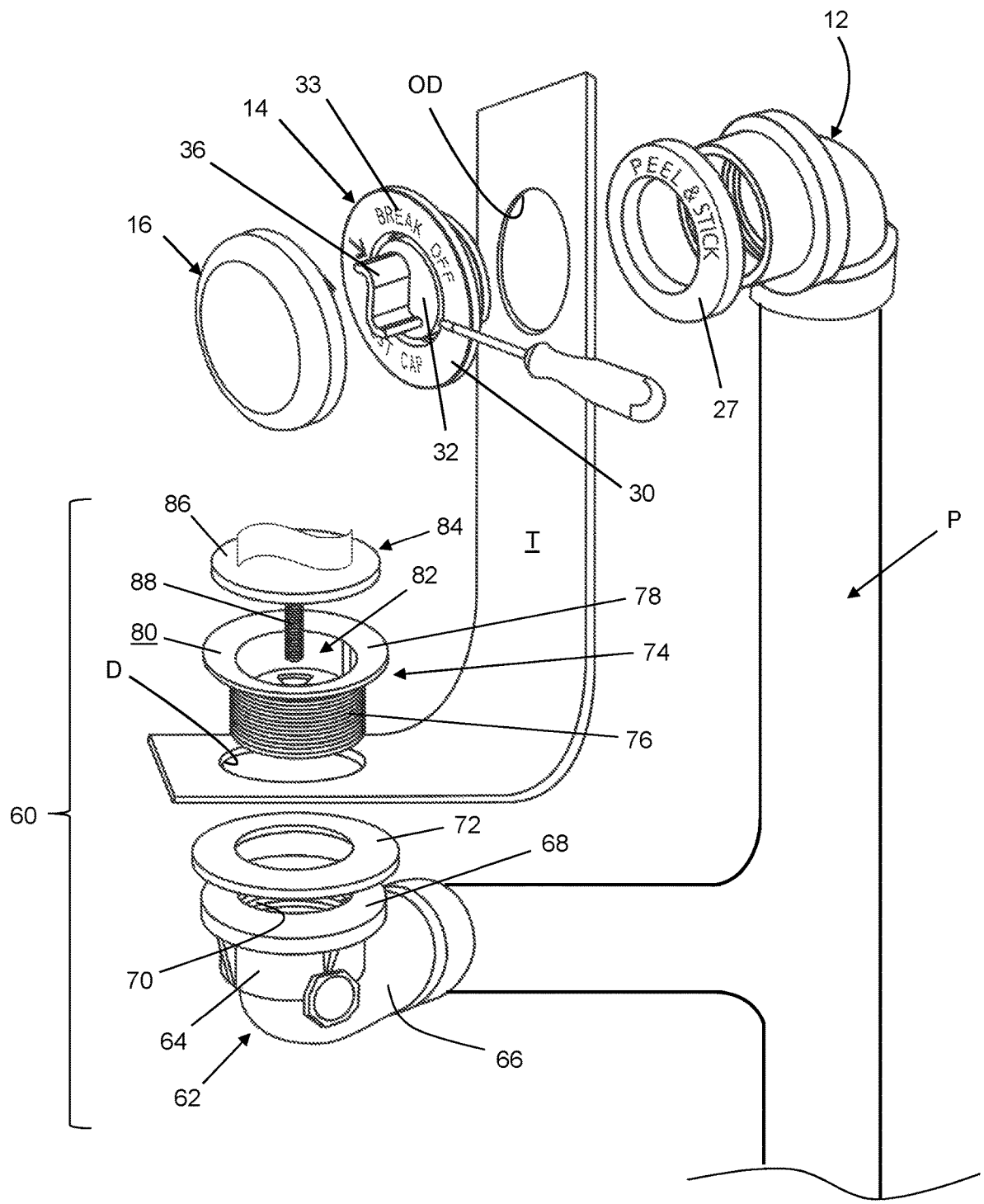
FIG. 10 is an exploded perspective view of a portion of a tub with a drain and drain assembly and an overflow drain and a tub overflow drain test assembly.

With reference to the figures, a tub overflow drain test system employs an overflow tub drain kit that generally includes cooperative connecting pipe member 12, test cap 14 and finishing plate or fixture 16, as best illustrated in FIG. 10 in conjunction with a partially illustrated tub T and drain D and overflow drain OD.

Figure 1:
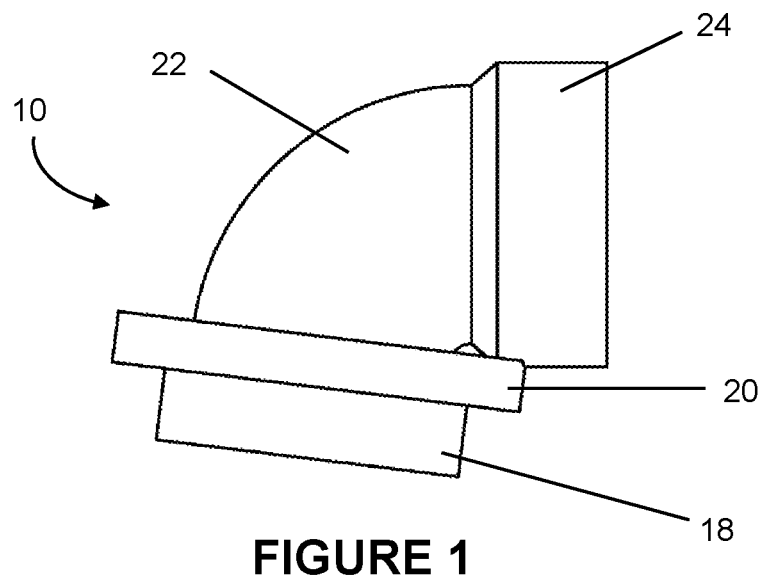
FIG. 1 is a side view of a connecting member for a tub overflow drain system test kit.
Figure 2:
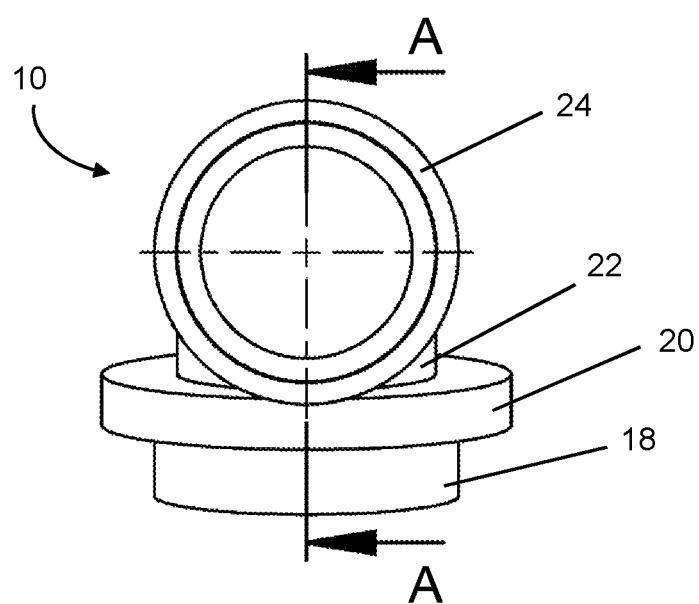
FIG. 2 is a rear view of the connecting member of FIG. 1.
Figure 3:
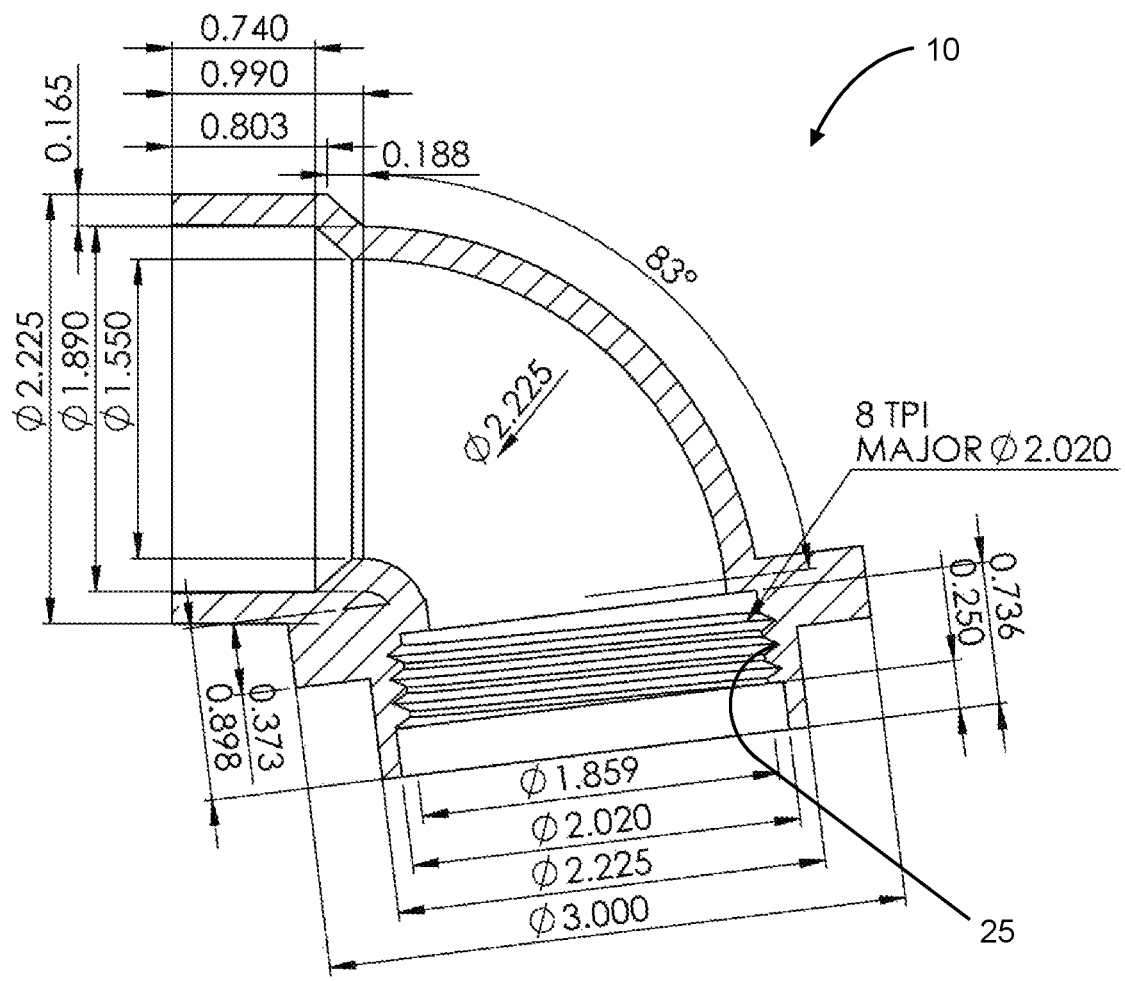
FIG. 3 is a sectional diagrammatic view of the connecting member taken along the line A-A of FIG. 2.
Figure 4:
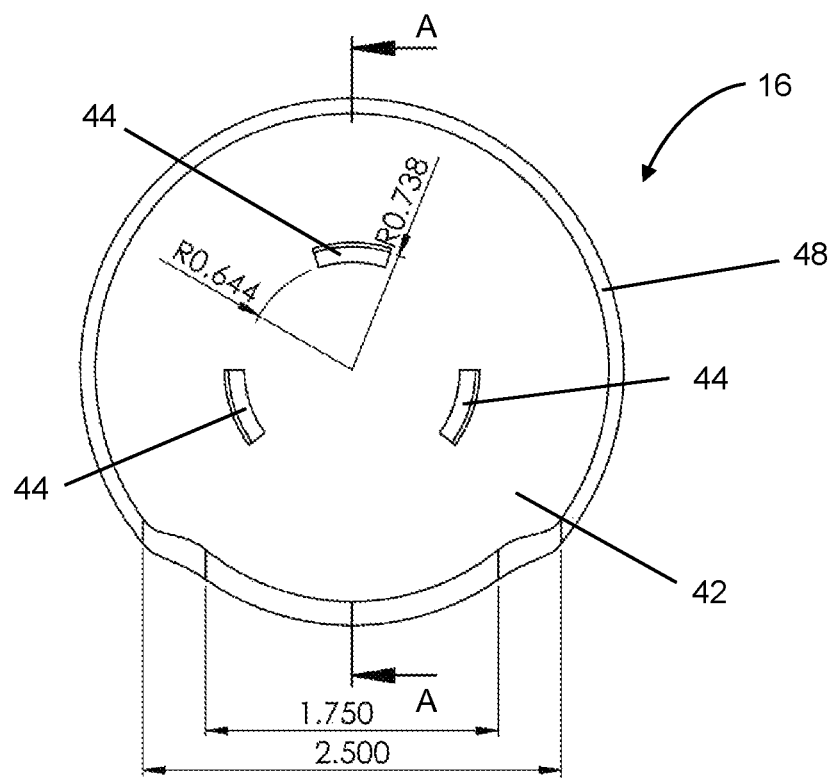
FIG. 4 is a rear diagrammatic view of a finishing fixture for the tub overflow drain system kit.
Figure 5:
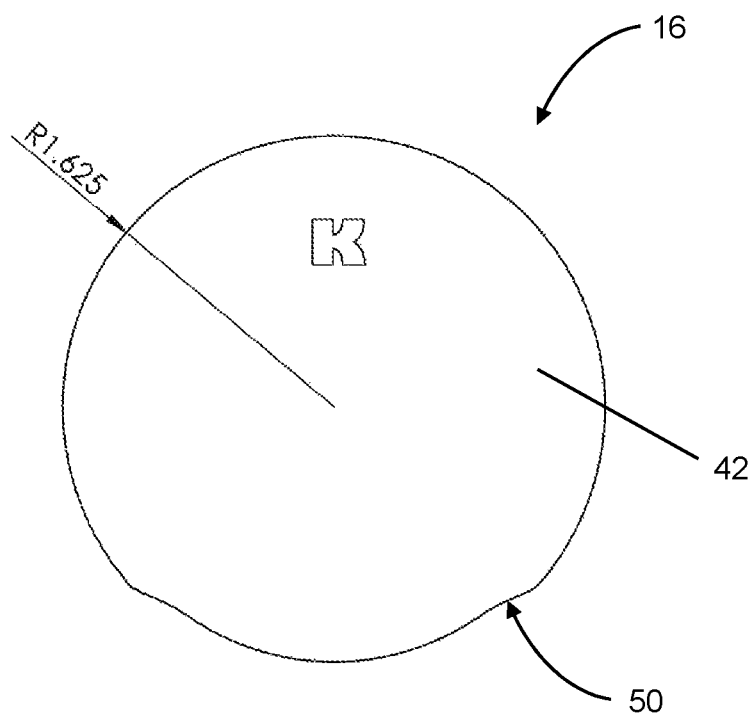
FIG. 5 is a front diagrammatic view of the finishing fixture of FIG. 4.
Figure 6:
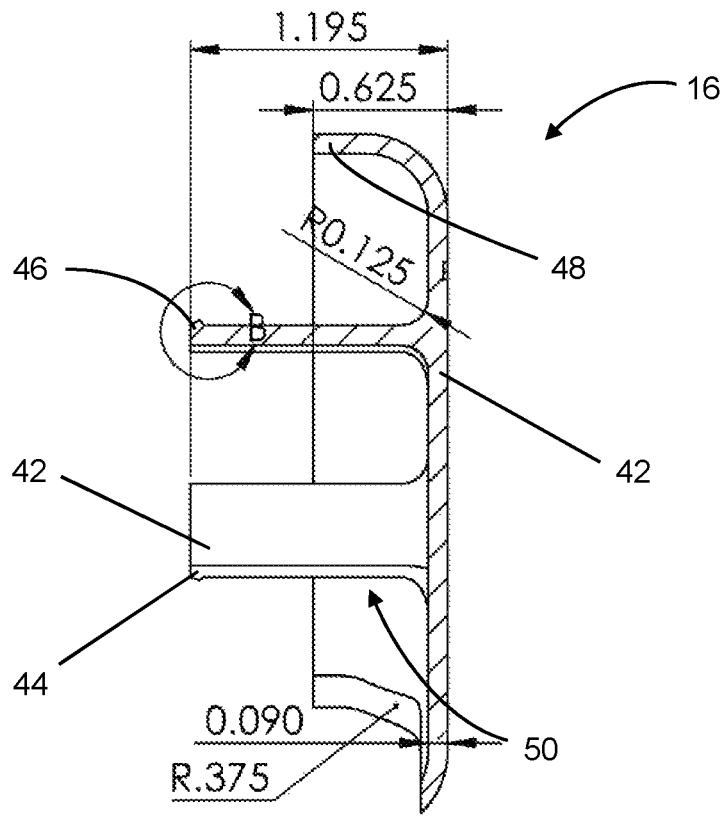
FIG. 6 is a sectional diagrammatic view of the finishing fixture of FIG. 4 member taken along the line A-A thereof.
Figure 7:
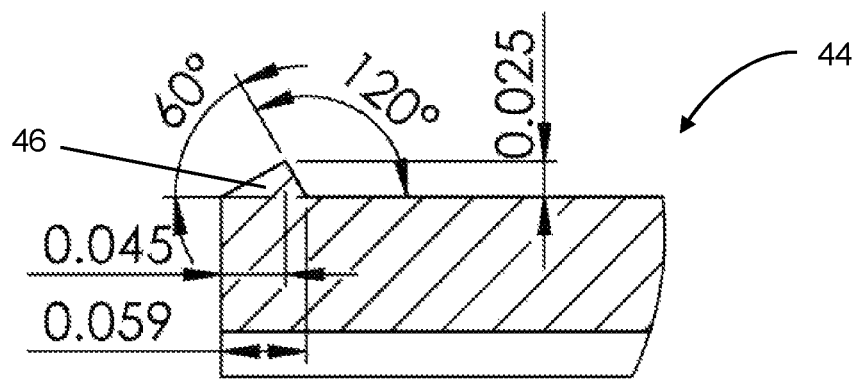
FIG. 7 is an enlarged sectional diagrammatic view of detail B of FIG. 6.

With reference to FIGS. 1-3, as shown the connecting member 12 is preferably an elbow member and includes a front cylindrical portion 18, a coaxial annular flange 20 extending outwardly from the outer surface, an intermediate transition portion 22 and a rear portion 24. The front cylindrical portion 18 includes threading 25 on its inner surface. In a typical installation, the front cylindrical portion 18 is configured to be positioned extending through or within an overflow opening in the wall of a tub or similar building structure with the intermediate flange 20 providing a rear stop against the rear surface of the tub. An optional adhesive ring 27 may be employed to secure and seal the connecting member in position relative to the tub T and overflow drain OD.

FIGS. 8 and 9A-C depict a test cap 14 configured to be used with the connecting member 12 of FIGS. 1-3. As shown, the test cap 14 includes a rear cylindrical portion 26 with an outer threaded surface 28. An annular flange 30 extends outwardly from the outer surface at a front position of the cylindrical portion 26. In an initial condition, a breakaway cover or cap seal 32 closes the inlet 34 of the test cap 14 and includes a tab 36. As shown, the seal 32 seals the inlet 34 via an integral circumferential section 38 that mates at the inner surface of the cylindrical portion 26 (See enlarged view of FIG. 8).

Section 38 is preferably in the form of a thin quasi-membrane of annular shape which, in one embodiment, has a thickness of 0.02 inches. In addition, the front of the test cap may include indicia 33 directing the breaking of the cap seal 32 or severing the seal or cover from the remaining portions of the cap. The cap seal 32 may be removed entirely by manual means or by usage of a simple tool, as illustrated in FIG. 10.

Figure 8:
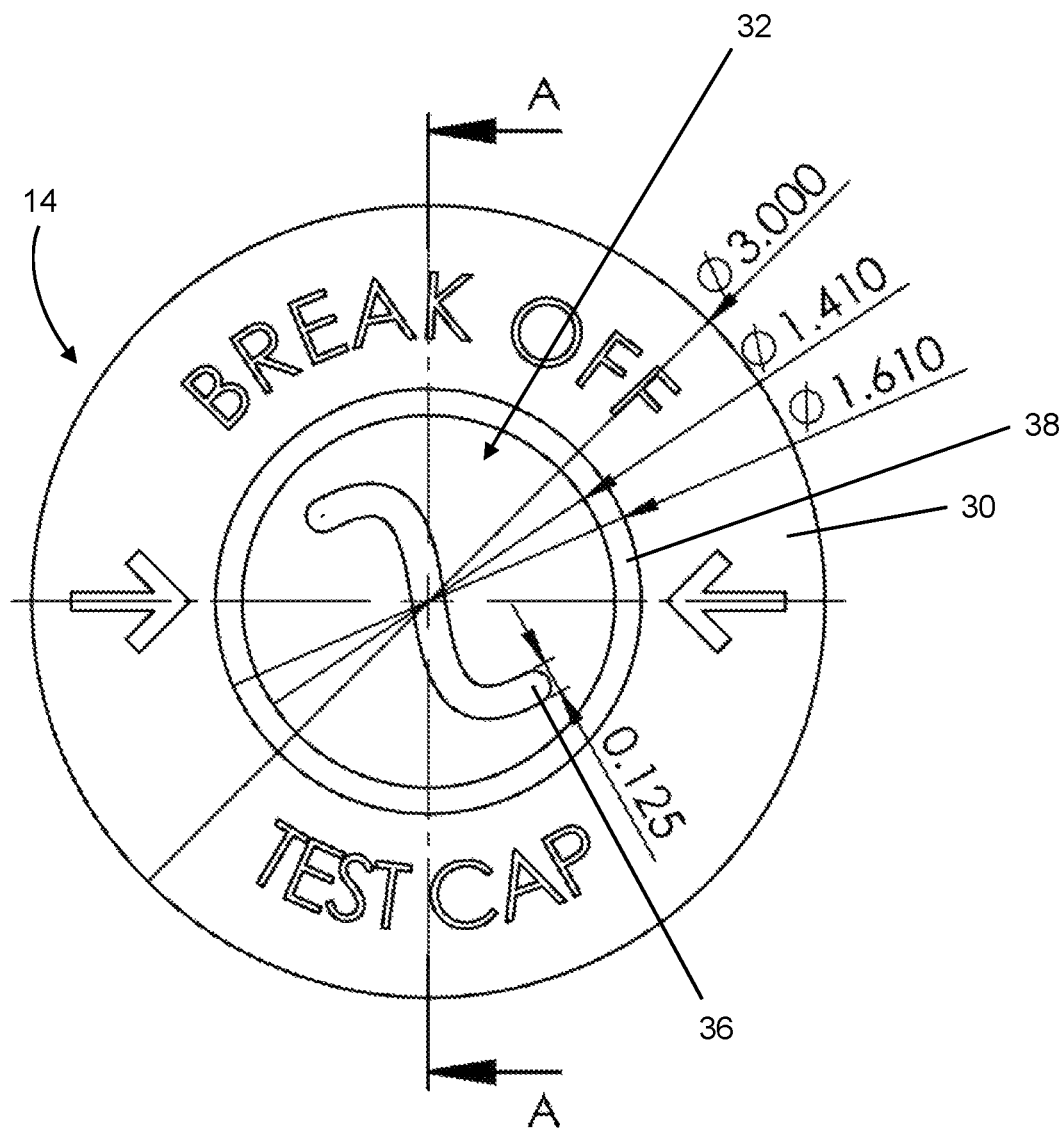
FIG. 8 is a front diagrammatic view of a test cap for the tub overflow drain system.

Importantly, the rear cylindrical portion 26 also defines an inner lip 40 that projects inward at the rear end (see enlarged view at bottom left of FIG. 8). Preferably, the inner lip 40 includes a ramp or similar transition portion 41 to assist a smooth insertion and engagement of tabs in the finishing fixture, as described below.

FIGS. 4-7 show an embodiment of a finishing fixture 16 for cooperative use with the connecting member 12 and test cap 14 described above. As shown, the fixture 16 includes a solid front face 42 with a plurality of angularly spaced, rearwardly extending tabs 44 radially inward from the outer edge of the fixture 16. Each tab 44 can include a distal tooth 46 for assisting mechanical engagement to the test cap 14, as described in detail below. The fixture 16 transitions rearward at its outer circumferential edge to provide a cupping flange 48 with an open portion 50. This embodiment of the finishing fixture 16 is configured with a low/slim profile design that does not impede or overlap with the water flow from a shorter length tub spout. Beyond the obvious advantage of not obstructing normal water flow from the spout, this configuration carries an added advantage in that drops from the spout or shower head do not land on the low profile fixture 16, and thus less soap scum and/or water marks accumulate on the fixture.

In an installation, the connecting member 12 (which is connected at its rear to normal pipes and other plumbing components) is positioned with the front cylindrical portion 18 within the overflow opening in a tub or similar with the annular flange 20 abutting the rear surface of the tub. The test cap 14 attaches to the connecting member 12 via threaded engagement between the outer threading 28 on the test cap rear cylindrical portion 26 and threading 25 on the inner surface of the front cylindrical portion 18. The elements are threaded together until the respective flanges, 20 and 30, tightly sandwich the tub wall thereby fixing the connecting member 12 and test cap 14 to the tub. Since the initial condition of the test cap 14 has a closed inlet via the cap seal 32, all necessary leak tests can be performed.

Once the tests are performed, the cap seal 32 can be removed via a user gripping the tab 44 and breaking away the seal 32. The cap seal 32 breaks from the inner cylindrical portion of the test cap 14 around the circumferential edge section 38 to open the inlet (for normal use). The test cap 14 (minus the seal 32) and connecting member 12 remain tightly fixed to the tub. The aesthetic finishing fixture 16 is thereafter attached by pressing the tabs 44 rearwardly until the teeth 46 snap over the lip 40. The cupping flange 48 envelopes the remaining portions of the test cap 14, including the outer annular flange 30. Typically, the open portion 50 is positioned at the bottom for receiving the overflowing water, which flows out from the tub through the assembly.

In a preferred embodiment, each of the connecting member 12, test cap 14 and finishing fixture 16 is formed from a plastic material, such as PVC. The elements may be fit with appropriate sealing members (O-rings or similar) to assist in maintaining a tight fluid seal between elements and in the plumbing system.

Several Figures include identification of preferred dimensions of the respective elements in millimeters or, where indicated, inches. As those of skill in the art would readily understand, none of these properties are limiting to the inventiveness of the disclosed tub overflow drain system or plumbing kit.

Altogether, the relationships between the connecting member 12, test cap 14 and finishing fixture 16 and their respective elements has been shown to provide noticeable improvement in the ease of testing and installation as well as strength and robustness of attachment of the kit elements to one another and a tub.

Also depicted in the plumbing assembly shown in FIG. 10 is a waste shoe assembly 60 for the lower drain of the tub T. The waste shoe assembly 60 includes a bottom fixing 62, an top fixing 74 and an annular seal member 72. As shown, the bottom fixing 62 takes the form of an elbow with an upper portion 64 and lower portion 66. The upper portion 64 carries an outward annular flange 68 and has threading 70 on its inner surface. The top fixing 74 has a lower cylindrical portion with threading on its outer surface configured to mate with the inner threading on the upper portion 64 of the bottom fixing 62. The top fixing 74 also carries an outwardly extending annular flange 78, which may have an upper surface that tapers downward from outer edges of the flange 78 toward the open center 82. A drain stopper 84 has a solid stop plate 86 with a threaded stem 88 configured to thread into a threaded bore defined within the top fixing 74.

As depicted in FIG. 10, the waste shoe assembly 60 is configured to attach to the tub T at the drain D with the tub T sandwiched between the seal member 72 and the flange 78 of the top fixing 74. The threaded cylindrical portion 76 extends through the drain D and threads into the bottom fixing 62 via the inner threading 70, which is tightened to affect a fluid tight seal around the drain D. When installed, the tub T around the drain D and sealing member 72 are tightly sandwiched between the flange 78 of the top fixing 74 and the flange 68 of the bottom fixing 62. In a typical installation, the waste shoe assembly 60 and overflow assembly fluidly connect to common plumbing P. The disclosed waste shoe assembly 60 has shown to simplify installation in that it includes fewer separate pieces from known waste shoe assemblies. Additionally, the direct attachment via the threaded cylindrical portion 76 and inner threading 70 has shown to be very robust and mechanically stable as compared to common waste shoe assemblies that require outer nuts and similar hardware.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A system for testing and finishing an overflow opening in a tub, comprising:
    a connecting member with a front cylindrical portion and an outer annular flange, the front cylindrical portion defining an inner threaded surface;
    a test cap with a rear cylindrical portion with an outer threaded surface defining an inlet, an outwardly extending annular flange at a front portion of the rear cylindrical portion, and an integral breakaway seal closing the inlet, the rear cylindrical portion defining an inner lip at a rear position; and
    a finishing fixture with a front face and a plurality of tabs extending rearwardly from a position radially inward of the outer circumferential edge of the finishing fixture, wherein
    the connecting member and test cap are attachable via their respective threaded surfaces,
    the breakaway seal is configured to be broken off from the test cap via human action, and
    the finishing fixture is configured for attachment to the test cap via engagement between the tabs and the inner lip.

2. The system of claim 1, wherein the front cylindrical portion of the connecting member is configured to be positioned within a hole in a tub wall followed by threading of the test cap rear cylindrical portion to the front cylindrical portion to sandwich the tub wall between the respective flanges; and the finishing fixture is attachable to the connecting member and test cap via engagement of the tabs and the inner lip after the breakaway seal is broken off.

3. The system of claim 1, wherein the finishing fixture tabs are angularly spaced.

4. The system of claim 1, wherein the connecting member, the test cap and the finishing fixture are each unitary components having a plastic composition.

5. The system of claim 1, wherein said breakaway seal attaches to a thin plastic membrane adjacent the inlet.

6. The system of claim 5, wherein the membrane has a thickness of approximately 0.02 inches.

7. The system of claim 1, wherein said test cap has a transition portion for guiding tabs of the finishing fixture to an attached position.

8. The system of claim 7, wherein the transition portion is a contoured surface.

9. The system of claim 7, wherein the transition portion is a ramp.

10. An overflow testing assembly, comprising:
a tub having a wall defining an overflow opening;
a connecting member mounted in said overflow opening with a front cylindrical portion and an outer annular flange, the front cylindrical portion defining an inner threaded surface;
a test cap with a rear cylindrical portion with an outer threaded surface threadably engaged with said inner threaded surface and defining an inlet cover, an outwardly extending annular flange at a front portion of the rear cylindrical portion, and an integral breakaway seal connecting the inlet cover, the rear cylindrical portion defining an inner lip at a rear position; and
a tab extending from said inlet cover, wherein a force applied to said severs said inlet cover to provide fluid communication through said overflow opening.

11. The overflow testing assembly of claim 10, comprising:
a finishing fixture with a front face and a plurality of tabs extending rearwardly from a position radially inward of the outer circumferential edge of the finishing fixture, wherein the finishing fixture is configured for attachment to the test cap via engagement between the tabs and the inner lip upon severing an inlet cover.

12. The overflow testing assembly of claim 11, wherein the front cylindrical portion of the connecting member is configured to be positioned within the overflow opening so that threading of the test cap rear cylindrical portion to the front cylindrical portion sandwiches the tub wall between the respective flanges; and the finishing fixture is attachable to the connecting member and test cap via engagement of the tabs and the inner lip.

13. The overflow assembly of claim 12 wherein said overflow testing assembly has a transition portion for guiding tabs of the finishing fixture to an attached position.

14. A system for testing and finishing an overflow opening in a tub, comprising:
a connecting member with a front cylindrical portion and an outer annular flange, the front cylindrical portion defining an inner threaded surface;
a test cap with a rear cylindrical portion with an outer threaded surface defining an inlet, an outwardly extending annular flange at a front portion of the rear cylindrical portion, and an integral breakaway seal closing the inlet and having a forward projecting integral tab, the rear cylindrical portion defining an inner lip at a rear position; and
a finishing fixture with a front face and a plurality of angularly spaced tabs extending rearwardly from a position radially inward of the outer circumferential edge of the finishing fixture, wherein:
the connecting member and test cap are attachable via their respective threaded surfaces,
the breakaway seal is configured to be broken off from the test cap inner lip by applying force to said projecting tab, and
the finishing fixture is configured for attachment to the test cap via engagement between the tabs and the inner lip.

15. The system of claim 14, wherein the finishing fixture tabs are angularly spaced.

16. The system of claim 14, wherein said breakaway seal attaches to a thin plastic membrane adjacent the inlet.

17. The system of claim 16, wherein the test cap has indicia directing that the seal be broken off.

18. The system of claim 14, wherein the front cylindrical portion of the connecting member is configured to be positioned within a hole in a tub wall followed by threading of the test cap rear cylindrical portion to the front cylindrical portion to sandwich the tub wall between the respective flanges; and
the finishing fixture is attachable to the connecting member and test cap via engagement of the tabs and the inner lip after the breakaway seal is broken off.

19. The system of claim 18, wherein said test cap has a transition portion for guiding tabs of the finishing fixture to an attached position.

20. The system of claim 18, wherein the connecting member has an elbow shape.

* * * * *